United States Patent
Schüler et al.

(10) Patent No.: US 7,000,874 B2
(45) Date of Patent: Feb. 21, 2006

(54) LEVER DRIVE FOR A VEHICLE SEAT ADJUSTER

(75) Inventors: Rolf Schüler, Heiligenhaus (DE); Dirk Angermann, Bergisch Gladbach (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 384 days.

(21) Appl. No.: 10/345,675

(22) Filed: Jan. 16, 2003

(65) Prior Publication Data

US 2003/0116689 A1    Jun. 26, 2003

Related U.S. Application Data

(63) Continuation of application No. PCT/EP01/10809, filed on Sep. 19, 2001.

(30) Foreign Application Priority Data

Oct. 20, 2000  (DE)  ................ 100 52 089
Nov. 18, 2000  (DE)  ................ 100 57 377

(51) Int. Cl.
*F16M 11/00*  (2006.01)

(52) U.S. Cl. .................. 248/157; 248/422; 297/374

(58) Field of Classification Search ................ 248/421, 248/422, 396, 398, 157; 74/508, 516, 518, 74/523; 297/354.12, 361, 367, 374; 192/15
See application file for complete search history.

(56) References Cited

U.S. PATENT DOCUMENTS

| | | | |
|---|---|---|---|
| 4,098,135 A | | 7/1978 | Werner |
| 4,222,474 A | * | 9/1980 | Choudhury et al. ........ 477/112 |
| 4,856,763 A | * | 8/1989 | Brodersen et al. .......... 267/131 |
| 5,159,847 A | * | 11/1992 | Williams et al. ........... 74/337.5 |
| 5,239,891 A | * | 8/1993 | Stocker ...................... 74/513 |
| 5,934,753 A | * | 8/1999 | Lange ........................ 297/367 |
| 6,095,312 A | | 8/2000 | Schumann |
| 6,142,569 A | * | 11/2000 | Kidokoro et al. ........... 297/366 |
| 6,422,651 B1 | * | 7/2002 | Muhlberger et al. ... 297/344.12 |
| 6,592,186 B1 | * | 7/2003 | Muhlberger et al. ... 297/344.12 |
| 2002/0053824 A1 | | 5/2002 | Angermann et al. |

FOREIGN PATENT DOCUMENTS

| | | |
|---|---|---|
| DE | 44 00 910 A1 | 7/1995 |
| DE | 195 33 453 C2 | 3/1997 |
| DE | 19540631 A1 * | 5/1997 |
| DE | 197 05 485 C1 | 4/1998 |
| DE | 19802028 C1 | 5/1999 |
| EP | 0 844 134 A1 | 5/1998 |
| EP | 0 931 690 A1 | 7/1999 |
| FR | 2 314 535 | 6/1975 |

* cited by examiner

*Primary Examiner*—Ramon O Ramirez
(74) *Attorney, Agent, or Firm*—Womble Carlyle Sandridge & Rice, PLLC

(57) ABSTRACT

In a lever drive (11) for a vehicle seat adjuster, in particular in a motor vehicle seat, having a drive lever (17) which can be manually moved, at least one driven lever (21) operatively connected to the adjuster, and at least one transmission means (25), which transmits a torque acting on the drive lever (17) to the driven lever (21) with a transmission ratio, the transmission ratio changes as a function of the transmitted torque.

20 Claims, 4 Drawing Sheets

LEVER DRIVE FOR A VEHICLE SEAT ADJUSTER

CROSS-REFERENCE TO RELATED APPLICATION

This application is a continuation of PCT/EP01/10809, which designates the U.S., was filed Sep. 19, 2001, was published in German on May 2, 2002, and is entirely incorporated herein by reference.

BACKGROUND OF THE INVENTION

The present invention relates to a lever drive for a vehicle seat adjuster, in particular in a motor vehicle seat.

In vehicle seats, numerous adjusters with various drives are known for adjusting various parts, for example the inclination of the back rest or the height of the seating area. The adjuster disclosed in DE 44 00 910 A1 has a self-locking indexing mechanism, which is driven manually by a lever. Alternate lifting movements of the lever are converted into discontinuous rotational movements of the driven shaft of the indexing mechanism. The arrangements and dimensions of the lever and the components of the indexing mechanism that are operatively connected to the lever define the transmission ratio for the transmission of the torque. In practice, this lever drive still leaves something to be desired.

BRIEF SUMMARY OF THE INVENTION

One aspect of the present invention is the provision of improvements to a lever drive for a vehicle seat adjuster, in particular in a motor vehicle seat. In accordance with one aspect of the present invention, such a lever drive includes a drive lever that can be manually moved, at least one driven lever operatively connected to the adjuster, and at least one transmission means that transmits a torque acting on the drive lever to the driven lever with a transmission ratio, with the transmission ratio changing as a function of the transmitted torque.

The fact that a lever drive having a plurality of components is provided means that, firstly, a specific. transmission ratio can be predefined, which is matched to the structural conditions and, to a certain extent, can be selected independently of the adjuster and, for example, the indexing mechanism of the adjuster. It is possible, for example under low loading and with a small movement of the drive lever, given a pivotable drive lever with a small pivoting angle, to achieve a large movement of the driven lever and therefore of the adjuster, that is to say given a pivotable driven lever to achieve a large pivoting angle and therefore a large movement of the adjuster. The fact that the transmission ratio changes as a function of the transmitted torque means that the transmission ratio can be reduced under high loadings of the lever drive, in order to protect the adjuster from high loads and overloads. In the extreme case, the transmission means preferably prevents any transmission of the torque, as an overload safeguard. The change in the transmission ratio is preferably carried out automatically, that is to say without any action by the user. Using one drive lever, it is also possible for two or more driven levers to be driven, for example via a corresponding number of transmission means.

The transmission means can be designed, for example, as a control lever with two lever arms, of which an arm associated with the drive lever is shorter than an arm associated with the driven lever. The transmission means is preferably coupled to the drive lever and the driven lever by means of slot and pin guides in order to balance the lengths. In a preferred embodiment, the change in the transmission ratio is carried out by the bearing point of the transmission means in relation to the bearing points of the drive lever and of the driven lever being arranged to be moveable in a slotted guide with a bias, the bearing point of the transmission means preferably being moved within the slotted guide when the bias is overcome by the transmitted torque. The change in the transmission ratio is therefore carried out by means of a change in the geometry of the various lever arms of the lever drive. The drive lever and the driven lever can have a common bearing point, for example a bolt, or different bearing points.

In accordance with one aspect of the present invention, as a result of a rolling movement of a rolling cam belonging to the driven lever on a rolling guide of the drive lever (involute lever mechanism), the result, in addition to low friction, is also the advantage that no edge loading of the bearing points and associated impairment of efficiency occurs. As a rule, with simple production of the components, the rolling movement results from the fact that the more sharply curved rolling cam bears with contact on the less curved rolling guide.

The driven lever is preferably mounted eccentrically with respect to the rolling cam. This permits, firstly, a freer shape of the rolling cam and of the rolling guide, matched to the application requirements. Secondly, the rolling cam can be selected in such a way that at larger pivoting angles of the driven lever, the distance of the bearing point of the driven lever from the point of contact between rolling cam and rolling guide becomes smaller. This increases the efficiency in the ergonomically critical end positions, since then the lever arm for frictional forces at the point of contact, defined by the distance of the bearing point of the driven lever from the tangential plane through the point of contact, becomes smaller with respect to the bearing point of the driven lever. The desired characteristics of the rolling cam are achieved, for example, by means of a heart shape of the rolling cam as an edge for the driven lever.

The transmission ratio of the torque or pivoting angle transmitted from the drive lever to the driven lever may be constant over the entire pivoting range of the drive lever. Alternatively, the transmission ratio may change as a function of the transmitted torque, the rolling guide and the rolling cam being included in the transmission means. Provided as a further transmission means is preferably a spring-mounted intermediate element, preferably two intermediate elements for different pivoting directions. The spring belonging to the intermediate element, for example a lever spring, gives way under higher torques, so that the rolling guide changes its position and therefore the rolling movement of the driven lever changes. As a result of the pivoting movement of the intermediate element on the drive lever, there are low lever travel losses relating to the change in transmission ratio. In order to need as few components as possible, the rolling guide is preferably formed on the intermediate element which, in this case, is pivotably mounted in the drive lever.

The lever drive according to the invention can be used in various adjusters for a vehicle seat. For example, it can be used in a rotary adjuster for adjusting the seat height of a vehicle seat with an interposed indexing mechanism for a discontinuous pumping movement. Alternatively, it can be used in a backrest adjuster designed as a squash-plate fitting for a continuous pivoting movement.

BRIEF DESCRIPTION OF THE DRAWINGS

In the following text, the invention is explained in more detail using three exemplary embodiments illustrated in the drawings, in which.

DETAILED DESCRIPTION OF THE INVENTION

Figure 1:
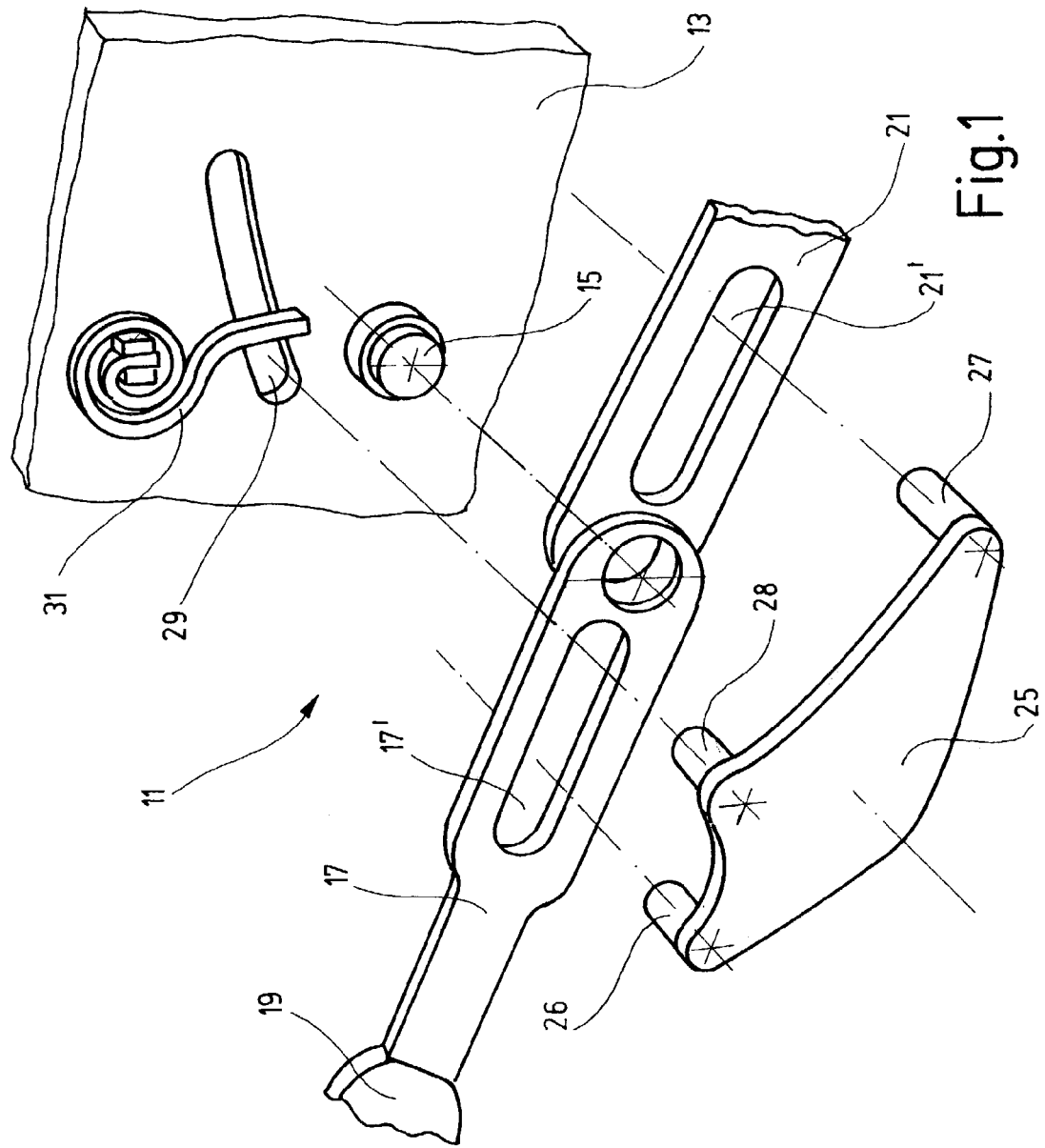
FIG. 1 shows a schematic, perspective view of the first exemplary embodiment.
Figure 2:
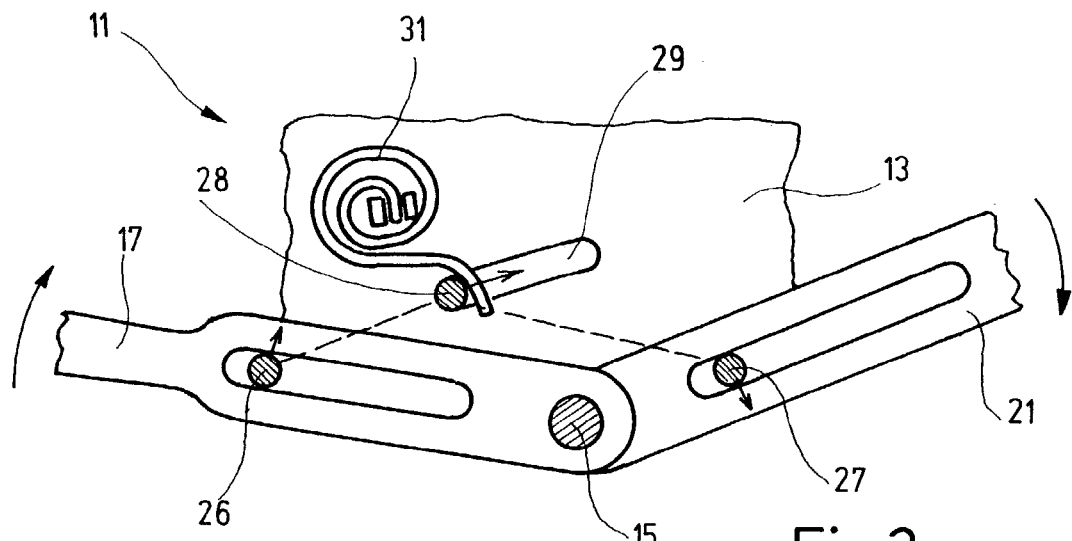
FIG. 2 shows a partly sectioned illustration of the first exemplary embodiment when transmitting a low torque.
Figure 3:
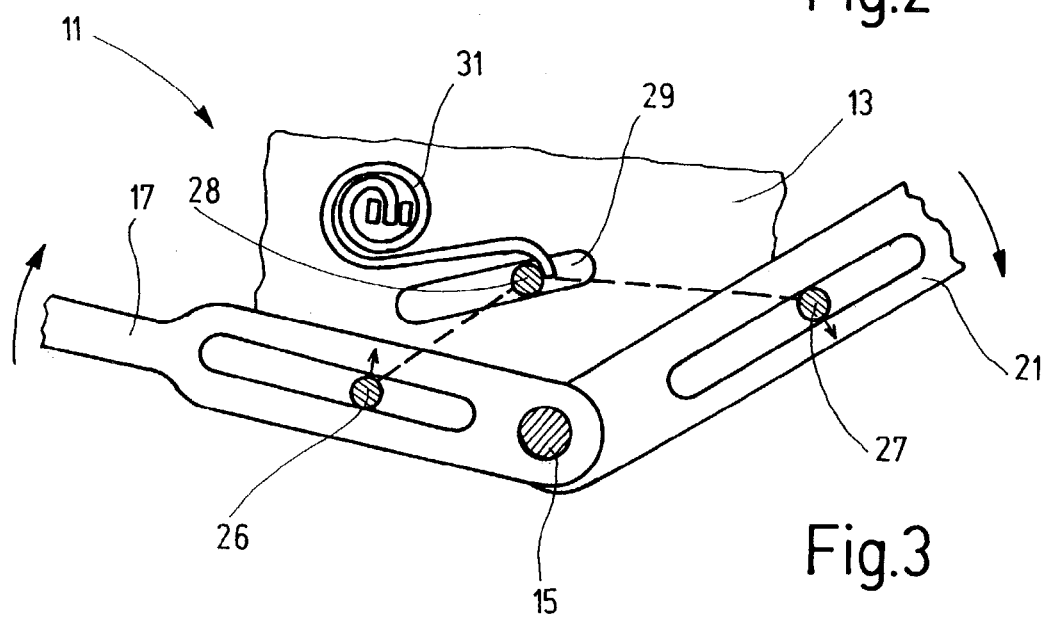
FIG. 3 shows a partly sectioned illustration of the first exemplary embodiment when transmitting a high torque.
Figure 4:
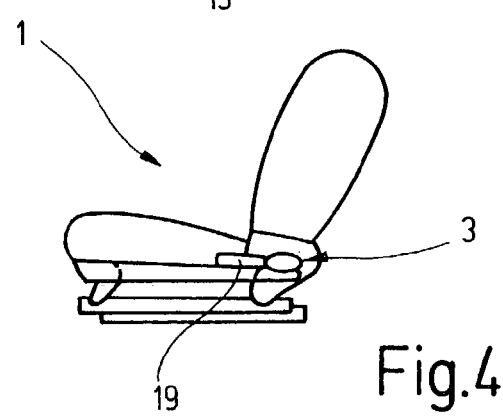
FIG. 4 shows a schematic illustration of an exemplary vehicle seat with a lever drive according to the first exemplary embodiment.
Figure 5:
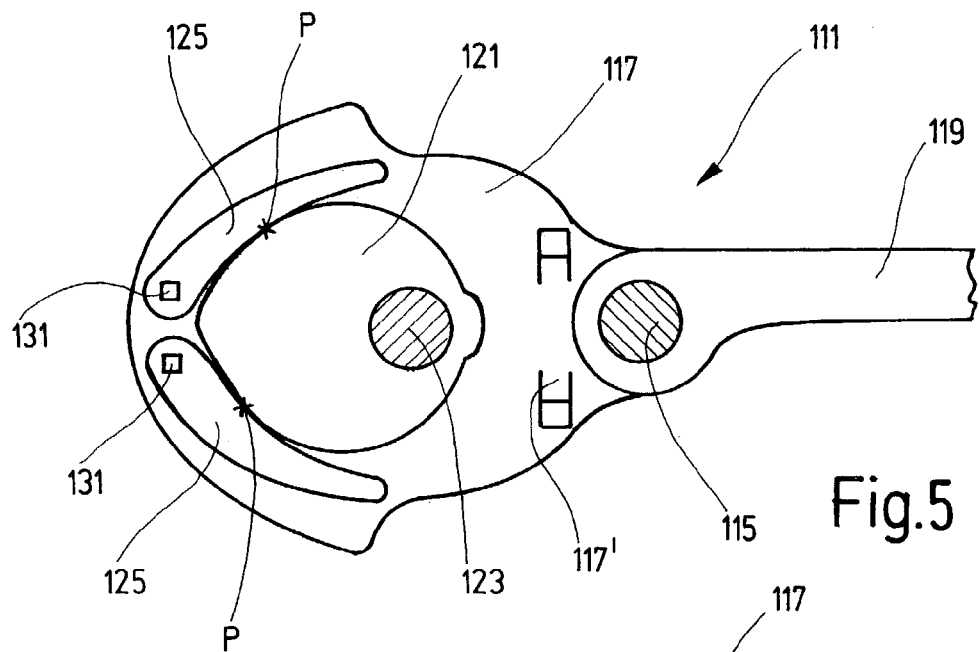
FIG. 5 shows a partly sectioned view of the second exemplary embodiment in the rest position.

In the first exemplary embodiment, a vehicle seat 1 has a rotary adjuster 3 with an indexing mechanism. The rotary adjuster 3 is used as a seat height adjuster for adjusting the height of the seating area and, if not driven, acts as a blocking means. The rotary adjuster 3 is driven with discontinuous rotary movements in the manner of a pumping movement via a lever drive 11 which acts on the indexing mechanism and is designed as a regulating mechanism.

From a baseplate 13 fixed to the seat structure, there projects a bearing pin 15, on which an elongated drive lever 17 is pivotably mounted. The alignment of the bearing pin 15 is referred to as axial below and defines the remaining directional specifications. Permanently fitted to the drive lever 17 is a handle 19 accessible from the outside as an operating element for the seat user, the handle 19 operating the lever drive 11 manually as a result of a pumping movement starting from a rest position. Also pivotably mounted on the bearing pin 15 is an elongated driven lever 21, which is operatively connected to the indexing mechanism, preferably with a driving pawl.

A flat control lever 25 with a somewhat triangular shape has a first pin 26, a second pin 27 and a third pin 28, which are all aligned parallel to one another and to the bearing pin 15 and project at right angles from the same side of the control lever 25, in the axial direction of the baseplate 13. The first pin 26 engages in a first groove 17' formed in the drive lever 17, the second pin 27 engages in a second groove 21' formed in the driven lever 21, and the third pin 28 engages in a third groove 29 formed in the baseplate 13, in each case slot-pin guides being formed. The third groove 29, serving as a slotted control guide, runs at least partially transversely with respect to that direction in which the drive lever 17 is aligned when in the rest position. The third pin 28 is biased by a control spring 31 towards that end of the third groove 29 which is arranged closer to the drive lever 17. The control spring 31 is, for example, formed as a spiral spring and fitted to the baseplate 13.

The control lever 25 serves as a transmission means for transmitting the torque acting on the drive lever 17 and applied by the seat user to the driven lever 21. In the process, during the pivoting movement of the drive lever 17, the first pin 26 is displaced within the first groove 17', so that on account of the changing lever arm and of the transmission angle, the torque transmitted to the control lever 25 changes continuously. The length of the groove 17' limits the possible pivoting range of the drive lever 17. The control lever 25 pivoting around the third pin 28 effects a pivoting movement of the driven lever 21, the second pin 27 being displaced within the second groove 21' during the pivoting movement of the control lever 25, so that on account of the changing lever arm and of the transmission angle, the torque transmitted to the driven lever 21 changes continuously.

The distances of the various pins 15, 26, 27 and 28 from one another are selected such that the lever arm defined by the pins 26 and 28, which are associated with the drive lever 17 and belong to the control lever 25, is shorter than the lever arm defined by the pins 27 and 28, which are associated with the driven lever 21 and belong to the control lever 25, and such that, when the torques to be transmitted by the lever drive 11 are low, for example in the case of an unloaded vehicle seat 1, the transmission ratio between the long-armed drive lever 17 and the short-armed driven lever 21 fluctuates only little and, for example, is in the range from 1:4 to 1:3. Using such a transmission ratio, small pivoting angles of the drive lever 17 can be converted into large pivoting angles of the driven lever 21 and therefore of the indexing mechanism of the rotary adjuster 3. During the pivoting movement of the control lever 25, one component of the forces transmitted acts in the direction of the third groove 29, that is to say counter to the force of the control spring 31. With the high transmission ratio, rapid adjustment of the rotary adjuster 3 can be achieved, that is to say in the present case coarse setting of the seat height.

If the torques to be transmitted by the lever drive 11 are high, for example with a seat user seated, the force component in the direction of the third groove 29 exceeds the bias of the control spring 31. The third pin 28 is pressed against the other end of the third groove 29, so that the pivot axis of the control lever 25 and, at the same time, the positions of the first and of the second pin 26 and 27 are displaced. As a result, the lever arm relationships are changed in such a way that drive lever 17 and driven lever 21 are operated with approximately equal-length arms. The transmission ratio is now about 1:1 to 1:0, at 1:0 an overload safeguard being implemented, when there is a right angle between bearing pin 15, first pin 26 and third pin 28. Precision adjustment of the rotary adjuster 3 can be achieved with the lower transmission ratio.

In the second exemplary embodiment, a vehicle seat 101 has a rotary adjuster 103 with an indexing mechanism. The rotary adjuster 103 is used as a seat height adjuster for setting the height of the seating area and, if not driven, acts as a blocking means. The rotary adjuster 103 is driven with discontinuous rotary movements in the manner of a pumping movement via a lever drive 111 which acts on the indexing mechanism and is designed as a regulating mechanism.

The lever drive 111 has a drive lever 117 pivotably mounted about a shaft 115. With respect to the flat drive lever 117 having a slightly arrow-like outline, the shaft 115 is arranged eccentrically at the end facing away from the point of the arrow. An elongated hand lever 119 is mounted at one end, likewise such that it can pivot about the shaft 115, and is connected there to the drive lever 117 so as to rotate with it or formed in one piece with it. The hand lever 119 is arranged in extension of the side of the drive lever 117 facing away from the point of the arrow, parallel to the axis of mirror symmetry of the drive lever 117. The hand lever 119 is fitted such that it is accessible from the outside as an operating element for the seat user, the seat user operating the lever drive 111 manually by means of a pumping movement starting from a rest position.

A flat driven lever 121 of heart-like shape is arranged to bear flat on the drive lever 117. A pin 123 permanently connected to the driven lever 121 projects from the driven lever 121 on the side facing away from the drive lever 117. The pin 123 is arranged eccentrically on the end of the driven lever 121 facing away from the point of the heart and is connected mechanically to the attached indexing mechanism of the rotary adjuster 103.

Two flat, elongated, slightly curved intermediate levers 125 of the same thickness as the driven lever 121 are arranged symmetrically with respect to the axis of mirror symmetry of the drive lever 117 and, at their end facing the point of the arrow, are mounted in the drive lever 117 by means of bearing bushes 127. Fitted to each intermediate lever 125 is a leaf spring 131 with a square profile which, from the side of the drive lever 117 facing away from the driven lever 121, is pushed through the bearing bush 127 into a square holder in the corresponding intermediate lever 125. Towards its other end, the leaf spring 131 is arranged to lie approximately parallel to the axis of mirror symmetry of the drive lever 117, bearing on a tab 117' belonging to the drive lever 117 in the vicinity of the shaft 115, on the side pointing outwards with respect to the axis of mirror symmetry of the drive lever 117.

Figure 6:
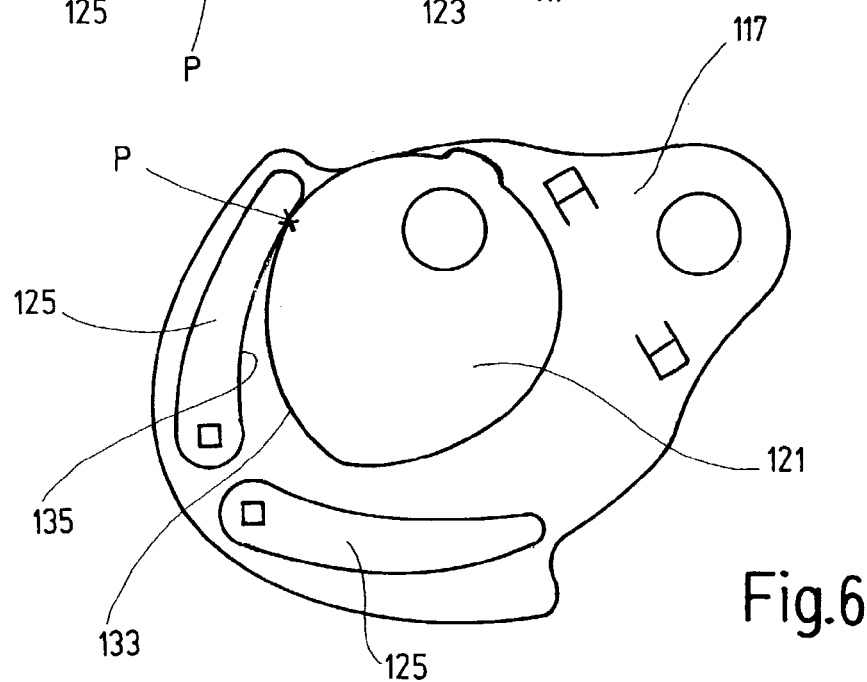
FIG. 6 shows an illustration corresponding to FIG. 5 without shafts and in a deflected position.
Figure 7:
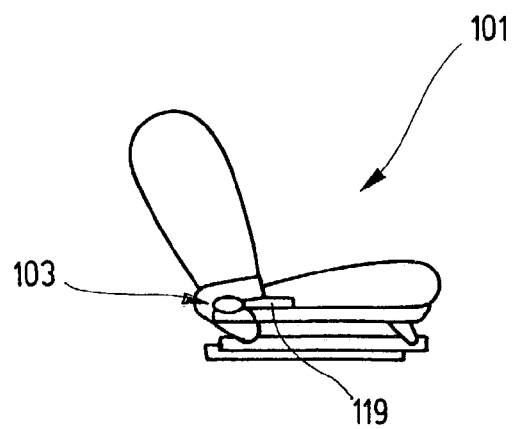
FIG. 7 shows a schematic illustration of an exemplary vehicle seat with a lever drive according to the second exemplary embodiment.
Figure 8:
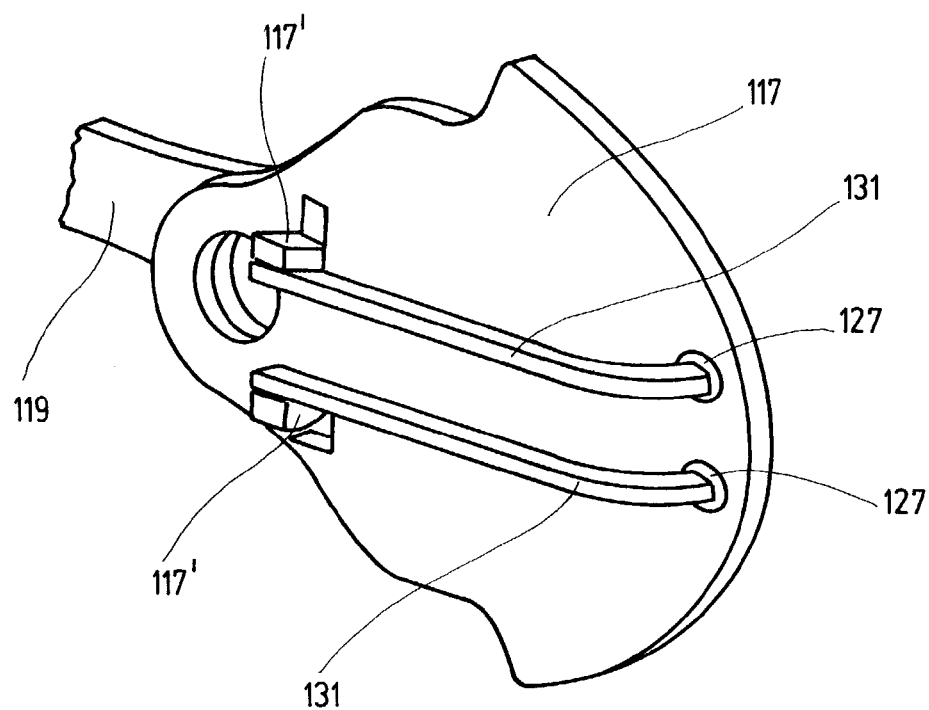
FIG. 8 shows a perspective view corresponding to FIG. 5 of the side facing away from the driven lever, without the shaft of the driving lever.
Figure 9:
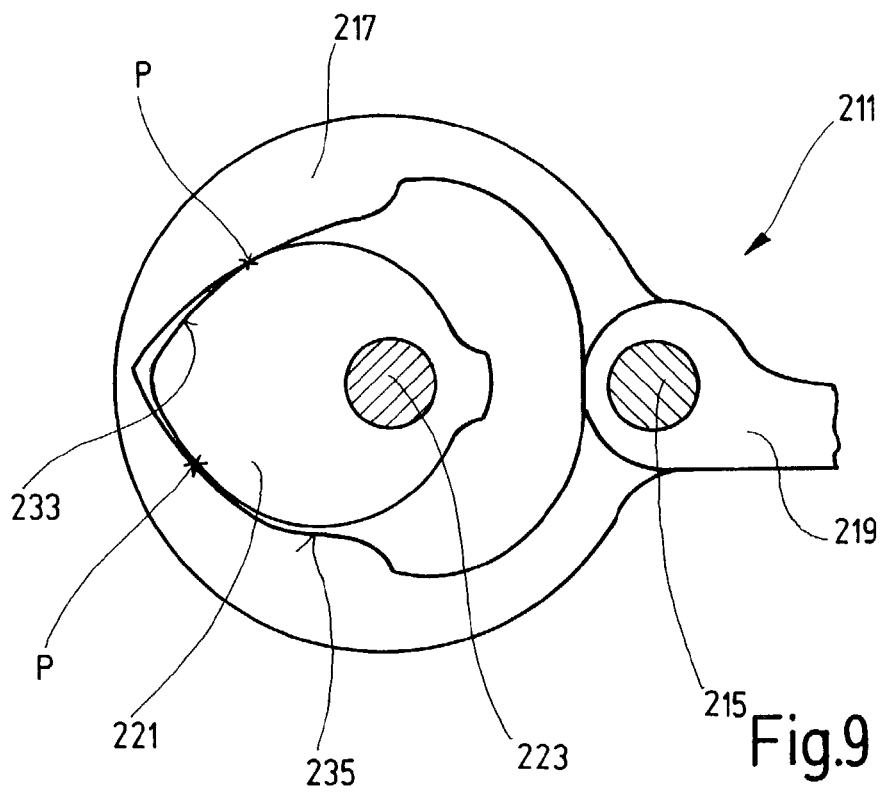
FIG. 9 shows a partly sectioned view of the third exemplary embodiment in the rest position.

The side of the driven lever 121 which points radially outwards with respect to the pin 123 forms a rolling cam 133, while the corresponding outer side of the intermediate lever 125, facing the driven lever 121, forms a rolling guide 135. The rolling cam 133 has a sharper curvature than the rolling guide 135 and therefore touches the latter at a point of contact P, and in each case at a point of contact P in the rest position of each intermediate lever 125. In the event of a pivoting movement of the hand lever 119, for example upwards, the drive lever 117 is pivoted downwards about the shaft 115. By means of the leaf spring 131 arranged in the pivoting direction, that is to say the upper leaf spring 131 in the present case, the upper intermediate lever 125, which is pivotably mounted on the leaf spring 131, is carried along. A rolling movement between intermediate lever 125 and driven lever 121 therefore takes place. During this rolling movement with low (rolling) friction, the point of contact P is displaced along the rolling cam 133 and the rolling guide 135, and the driven lever 121 rotates together with the pin 123. Such a deflected position following an upward pivoting movement in the counterclockwise direction is illustrated in FIG. 6.

The distance between the shaft 115 and the point of contact P is considerably greater than the distance between the pin 123 and the point of contact P, so that small pivoting angles of the drive lever 117, for example 30°, are transformed into large pivoting angles of the driven lever 121, for example 120°. With this high transmission ratio, quick setting of the rotary adjuster 103 can be achieved, that is to say coarse setting of the seat height in the present case. Since the rolling cam 133 approaches the pin 123 as the pivoting angle increases, because of the heart shape of the driven lever 121, preferably on account of a sharper curvature, the lever arm is reduced, that is to say the distance between the pin 123 and the tangential plane through the point of contact P, for the frictional moment arriving from the frictional forces at the point of contact P. The otherwise ergonomically critical efficiency in the driven lever end positions is improved as a result.

If the torques to be transmitted by the lever drive 111 are high, for example with a seat user seated, the driven lever 121 opposes a greater torque to the associated leaf spring 131 via the corresponding intermediate lever 125. The leaf spring 131 gives way somewhat and pivots the intermediate lever 125 a few degrees outwards. As a result, the driven lever 121 initially does not move, so that a certain initial travel or idle stroke is passed through by the drive lever 117; without a load, this travel would be equal to zero. In the further course of the actuation, the rolling movement of the driven lever 121 begins, and the intermediate lever 125 pivots about the bearing point of the leaf spring 131 as a function of the moment opposed by the driven lever 121. In the process, the transmission ratio decreases, that is to say the pivoting angle of the driven lever 121 becomes smaller as a result of the rolling movement. With the lower transmission ratio, precision adjustment of the rotary adjuster 103 can be achieved.

The third exemplary embodiment relates to a lever drive 211 with a constant transmission ratio. Identical or identically acting components bear reference symbols increased by 100. If not otherwise described, this exemplary embodiment is the same as the previous one.

A hand lever 219 accessible to the user is firmly connected so as to rotate with the drive lever 217 that can be pivoted about a shaft 215. From a heart-like driven lever 221 there projects a pin 223, which has a mechanical connection to the indexing mechanism or the like connected downstream. The side of the driven lever 221 that faces radially outwards with respect to the shaft 215 forms a rolling cam 233. At a point of contact P, at two points of contact P in the rest position, the rolling cam 233 touches a rolling guide 235 belonging to the drive lever 217 of smaller curvature. The rolling guide 235 consists of the edge of a space which is provided as a cut-out in the drive lever 217 and which at the same time accommodates the driven lever 221.

In the event of a pivoting movement of the hand lever 219, the driven lever 221 executes a rolling movement on the drive lever 217, which increases the pivoting angle. The functioning is the same as in the previous exemplary embodiment, but the transmission ratio between drive lever 217 and driven lever 221 remains constant. A nose-like bulge on the rolling cam 233 and a matching receptacle on the rolling guide 235 can serve as a stop for limiting the pivoting movement of the driven lever 221. This also applies in the case of the second exemplary embodiment.

What is claimed is:

1. A lever drive for a vehicle seat adjuster, comprising:
   a pivotably mounted drive lever that can be manually pivoted and includes a rolling guide; and
   at least one pivotably mounted driven lever which is for being operatively connected to the adjuster and includes a rolling cam which bears on the rolling guide, with the rolling cam and the rolling guide being configured so that a smoothly curved border of the rolling cam carries out a rolling movement on and along a smoothly curved border of the rolling guide in response to a pivoting movement of the drive lever and thereby transforms the pivoting movement of the drive lever into a larger pivoting movement of the driven lever.

2. A lever drive according to claim 1, wherein at least one spring-mounted intermediate element is provided between the drive lever and the driven lever, with the intermediate element including the rolling guide and being operative so that a transmission ratio from the drive lever to the driven lever changes as a function of torque transmitted from the drive lever to the driven lever.

3. A lever drive according to claim 2, wherein the spring-mounted intermediate element is further operative for acting as an overload safeguard such that at excessively high torques the combination of the spring-mounted intermediate element, the rolling guide and the rolling cam does not transmit any torque.

4. A lever drive according to claim 2, wherein:
the driven lever is mounted eccentrically with respect to the rolling cam,
the driven lever is pivotably mounted at a bearing point, and
a distance between the bearing point and a point of contact between the rolling cam and the rolling guide becomes smaller at larger pivoting angles of the driven lever.

5. A lever drive according to claim 1, wherein:
the driven lever is mounted eccentrically with respect to the rolling cam,
the driven lever is pivotably mounted at a bearing point, and
a distance between the bearing point and a point of contact between the rolling cam and the rolling guide becomes smaller at larger pivoting angles of the driven lever.

6. A lever drive according to claim 5, wherein a transmission ratio from the drive lever to the driven lever is constant over the entire pivoting range of the drive lever.

7. A lever drive according to claim 1, wherein a transmission ratio from the drive lever to the driven lever is constant over the entire pivoting range of the drive lever.

8. A lever drive according to claim 1, wherein the lever drive is in combination with a vehicle seat that includes the adjuster, and the adjuster is driven via the lever drive.

9. A lever drive according to claim 1, wherein the rolling guide at least partially defines a cavity of the drive lever.

10. A lever drive according to claim 9, wherein the cavity is a cut-out portion of the drive lever.

11. A lever drive according to claim 9, wherein the driven lever is positioned in the cavity.

12. A lever drive according to claim 1, wherein the rolling cam comprises a side of the driven lever which faces radially outward.

13. A lever drive according to claim 1, wherein the driven lever substantially defines a heart-like shape.

14. A lever drive according to claim 1, further comprising a lever that is for being gripped with a hand and is mounted for pivoting with the drive lever.

15. A lever drive according to claim 14, wherein both the drive lever and the lever that is for being gripped with a hand are mounted for pivoting around a shaft.

16. A lever drive according to claim 1, wherein the driven lever is for being connected to an indexing mechanism of the adjuster.

17. A lever drive for a vehicle seat adjuster, comprising:
a drive lever that is mounted for pivoting and includes a guide having a smoothly curved surface which is a border of the drive lever; and
at least one pivotably mounted driven lever which is for being connected to the adjuster and includes a cam with a smoothly curved surface which bears on the curved surface of the guide, wherein the curved surface of the cam is a border of the driven lever,
with the cam and the guide being configured so that the curved surface of the cam carries out a rolling movement on and along the curved surface of the guide in response to a pivoting movement of the drive lever and thereby transforms the pivoting movement of the drive lever into a larger pivoting movement of the driven lever.

18. A lever drive according to claim 17, wherein:
the driven lever is pivotably mounted at a bearing point such that the driven lever is arranged eccentrically with respect to the cam, and
a distance between the bearing point and a point of contact between the curved surface of the cam and the curved surface of the guide becomes smaller at larger pivoting angles of the driven lever.

19. A lever drive according to claim 17, wherein the curved surface of the guide at least partially defines a cavity of the drive lever, and the driven lever is at least partially positioned in the cavity.

20. A lever drive according to claim 17, wherein the driven lever substantially defines a heart-like shape.

* * * * *